United States Patent
Lines et al.

(10) Patent No.: US 12,545,591 B1
(45) Date of Patent: Feb. 10, 2026

(54) AMMONIA PRODUCTION SYSTEMS AND METHODS

(71) Applicant: Battelle Memorial Institute, Richland, WA (US)

(72) Inventors: Amanda M. Lines, West Richland, WA (US); Samuel S. Morrison, Richland, WA (US); Lance R. Hubbard, Richland, WA (US); Samuel A. Bryan, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 807 days.

(21) Appl. No.: 17/838,837

(22) Filed: Jun. 13, 2022

(51) Int. Cl.
*C01C 1/04* (2006.01)
*B01J 20/06* (2006.01)
*B01J 20/08* (2006.01)
*B01J 20/10* (2006.01)

(52) U.S. Cl.
CPC .......... *C01C 1/0411* (2013.01); *B01J 20/06* (2013.01); *B01J 20/08* (2013.01); *B01J 20/10* (2013.01)

(58) Field of Classification Search
CPC ......... C01C 1/0411; B01J 20/06; B01J 20/08; B01J 20/10
See application file for complete search history.

(56) References Cited

U.S. PATENT DOCUMENTS

| | | | |
|---|---|---|---|
| 8,986,514 B2 * | 3/2015 | Yamauchi | B01J 35/45 204/157.46 |
| 2021/0380426 A1 * | 12/2021 | Yagi | C01C 1/0405 |

* cited by examiner

*Primary Examiner* — Stuart L Hendrickson
*Assistant Examiner* — Jaanzeb C Raja
(74) *Attorney, Agent, or Firm* — Wells St. John P.S.

(57) ABSTRACT

Ammonia production systems are provided that can include: a reactor configured to receive $N_2$ and $H_2$; catalyst within the reactor, the catalyst comprising material having a band gap >3 eV; and a radiation conduit extending into the reactor and configured to expose the $N_2$, $H_2$, and catalyst to the radiation and form $NH_3$.

Methods for producing ammonia are also provided. The methods can include: providing a catalyst comprising material having a band gap >3 eV; exposing the catalyst to both $N_2$ and $H_2$; and while the catalyst is exposed to both $N_2$ and $H_2$, exposing the catalyst to radiation to form $NH_3$. The methods can also include providing a catalyst comprising material having a high-band gap; exposing the catalyst to both $N_2$ and $H_2$; and while the catalyst is exposed to both $N_2$ and $H_2$, exposing the catalyst to gamma rays to form $NH_3$.

15 Claims, 2 Drawing Sheets

AMMONIA PRODUCTION SYSTEMS AND METHODS

STATEMENT AS TO RIGHTS TO DISCLOSURES MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

The field of the invention is ammonia production, particularly production systems and methods that utilize catalysts and radiation to prepare ammonia.

BACKGROUND

Ammonia is one of the most produced chemical commodities in the world, second only to sulfuric acid. More than half the ammonia produced is used in agriculture, making ammonia one of the most needed compounds for feeding the entire world's population and paving the way for the last centuries growth during the industrial revolution.

The production of ammonia is currently performed by the Haber-Bosh process, invented in the 1918, and still in use, even though this process is very energy intensive, requiring high temperatures (400-600° C.) and high pressures (20-40 MPa) to make this process viable. Meeting the global needs for ammonia production is a challenge, and currently 25% of the global energy produced is utilized for driving the current ammonia production process. Improvements on this process would be truly world changing, because improved production of ammonia would save enormous amounts of energy and lower carbon footprint of ammonia production. At least one improvement to this process would be lowering the significant energy of the process to lower costs over the current process.

The present disclosure provides systems and methods for the production of ammonia that requires less energy from the power grid, ultimately leading to a more affordable and sustainable production of ammonia to meet the global demands.

SUMMARY

Ammonia production systems are provided that can include: a reactor configured to receive $N_2$ and $H_2$; catalyst within the reactor, the catalyst comprising material having a band gap >3 eV; and a radiation conduit extending into the reactor and configured to expose the $N_2$, $H_2$, and the catalyst to the radiation to form $NH_3$.

Methods for producing ammonia are also provided. The methods can include: providing a catalyst comprising material having a band gap >3 eV; exposing the catalyst to both $N_2$ and $H_2$; and while the catalyst is exposed to both $N_2$ and $H_2$, exposing the catalyst to radiation to form $NH_3$. The methods can also include providing a catalyst comprising material having a high-band gap; exposing the catalyst to both $N_2$ and $H_2$; and while the catalyst is exposed to both $N_2$ and $H_2$, exposing the catalyst to gamma rays to form $NH_3$.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

The present disclosure provides systems and methods that use materials having >3 eV band gap, such as moderate or high-band gap materials including semi-conductor materials to drive chemical reactions. High-band gap materials such as $Al_2O_3$ and $SiO_2$ have tremendous electron injection sites (~−4V) and oxidative holes (~+4V), when irradiated by gamma radiation.

The systems and methods can use moderate band gap materials such as $TiO_2$ and can use radiation such as visible photons. These lower band gap materials have much lower reducing or oxidized potentials owing to the nature of the visible photons being lower in energy to drive a higher band gap separation required for high-band gap materials.

The systems and methods of the present disclosure can provide ammonia production without taking energy off the grid by using catalyst designed to work efficiently with radiation, such as gamma radiation (an unused reactor and spent nuclear fuel byproduct). The systems and methods can use higher reduction potential materials (high-band gap semiconductor materials, such as $Al_2O_3$, $SiO_2$) which have conduction band (CB)/valence band (VB) separations of −4.21 eV/+4.09V and −4.24V/+4.26V respectively, compared to lower band gap materials (such as $TiO_2$) having CB/VB separations of −0.17/+2.97V. The additional 2+ volts in driving potential can be beneficial when breaking the N—N triple bond energy (which is considered the rate determining step in the reaction of nitrogen ($N_2$) and hydrogen ($H_2$) to produce ammonia ($NH_3$)).

The catalysts of the present disclosure can be prepared by chemically treating the catalyst with a ligand or dopant to produce a doped material having a band gap >3 eV. This doped material can be modified with nanoparticles (e.g., iron metal) via boiling in a glycol solution having silane MPTMS and iron. The recovered nanoparticles can be oxidized in air at elevated temperatures and then stored in an inert atmosphere (e.g., Ar).

For example, titanium dioxide can be chemically treated with iron chloride under hydrothermal conditions to produce an Fe-doped titania solid catalyst having a band gap >3 eV. The TiOx can be modified with isolated nanoparticles of iron metal by a modified stober method of boiling in ethylene glycol in the presence of 10:1-100:1 silane MPTMS to iron. The iron nanoparticles can then be oxidized to make catalytic sites in air at 250° C. for 1 hr. Further drive in was performed under vacuum at 250° C. for 3 hrs. The oxidized nanoparticles can then be stored under Ar until use.

Figure 1:
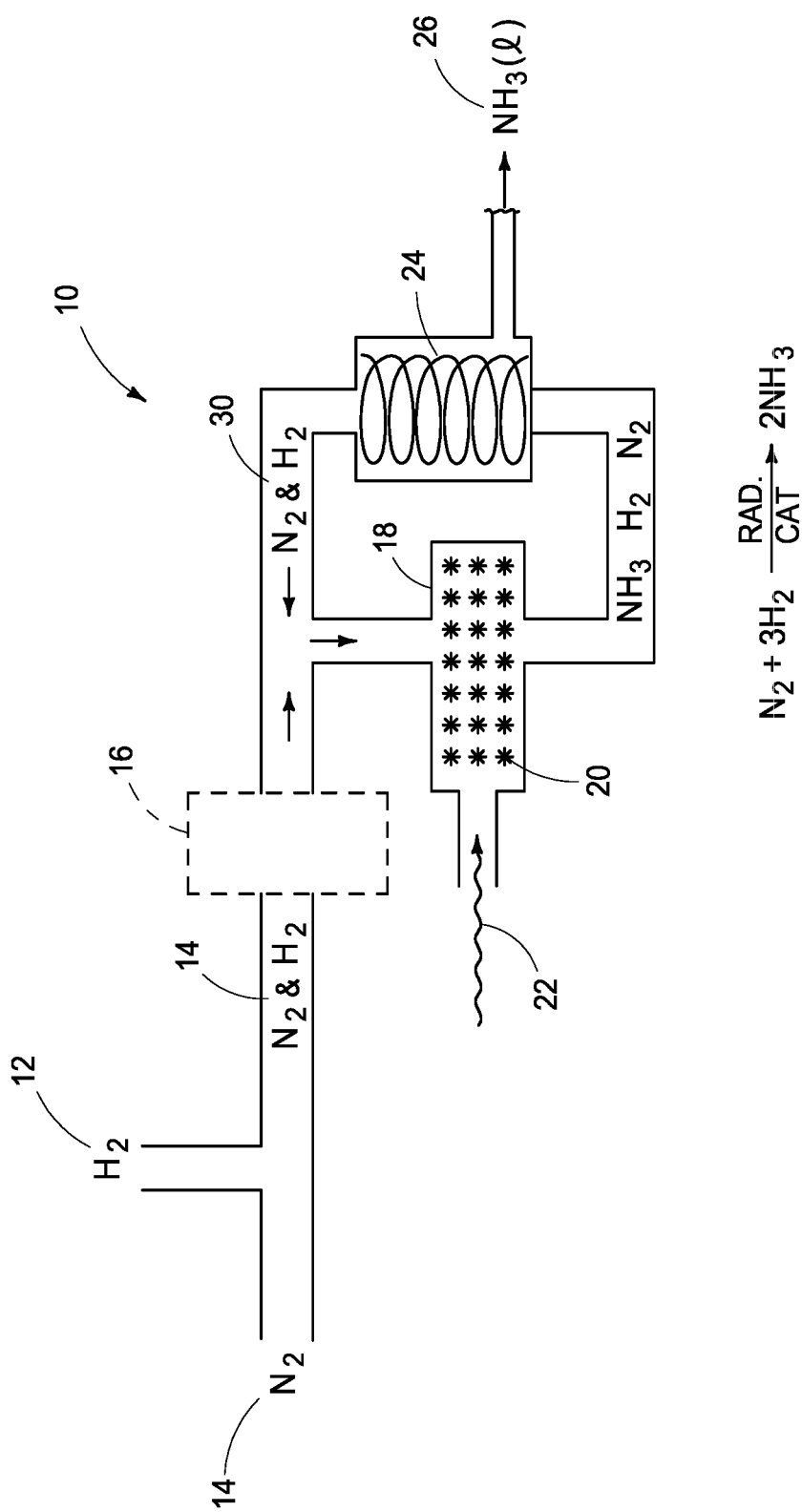
FIG. 1 is an ammonia production system according to an embodiment of the disclosure.

Referring to FIG. 1, an ammonia production system 10 is provided that can include a reactor 18 configured to receive $N_2$ (14) and $H_2$ (12). Catalyst 20 can be within reactor 18, and the catalyst can include material having a band gap >3 eV. This material can be semiconductive material.

Figure 2:
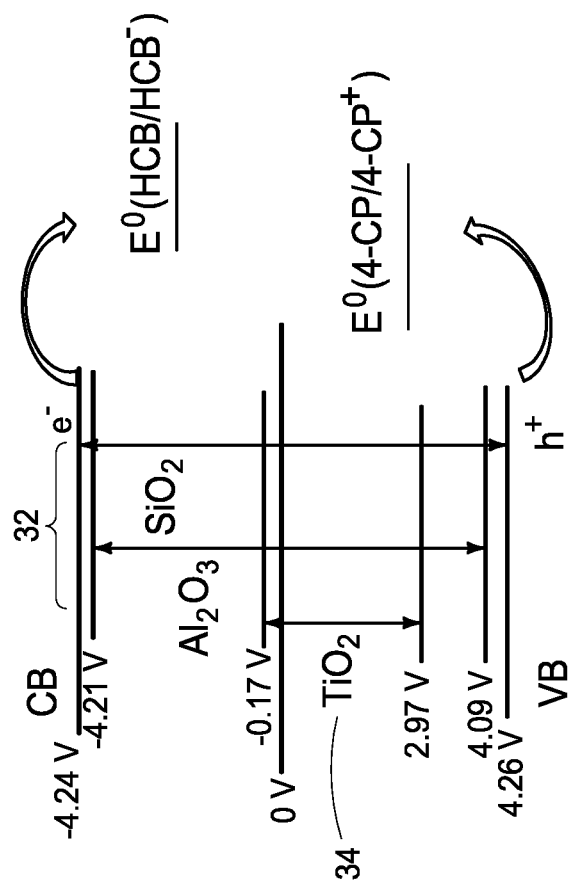
FIG. 2 is a depiction of band gaps of example catalysts for use in the production systems and methods of the present disclosure.

Referring next to FIG. 2, an example depiction of band-gap materials is shown that have band-gaps >3 eV; for example, $SiO_2$, $Al_2O_3$, and $TiO_2$. All have band-gaps >3 eV.

Additionally, materials that can be used that have band gaps >3 eV include one or more of $Al_2Ox$, AlOxSiOy, GaOx, AlN, FTO, $TiO_2$, $SnO_2$, ZnO, $WO_3$, $Nb_2Ox$, $BaSnO_3$, $Zn_2SnO_4$, $SrTiO_3$, $BaTiO_3$, $Zn_2Ti_3O_8$, BN, BO, SiO, ITO, $ZrO_2$, and/or $ZrSiO_4$. These materials can also be coupled to and/or doped with a ligand such as one or more of the following: FeOx, FeS, FeMo, FeCo, Co, Mo, Ru, FeRu, FePd, FePt, Pd, Pt, FePtPd, FePtO, and/or FePdO.

In accordance with example implementations and with respect to the methods of the present disclosure, $N_2$ and $H_2$ can be provided as mixture 14 and this mixture 14 can be controlled via control component 16. Control component 16 can include a series of pressure differentiation assemblies such as one or more of pumps, for example. Additionally, control can be provided by valves that can control the flow of mixture 14 to reactor 18.

In accordance with example implementations, mixture 14 can proceed to reactor 18, where mixture 14 is exposed to catalyst 20, and then also exposed to radiation 22. Radiation 22 can be one or more of alpha, beta, neutron, and/or electromagnetic radiation. One example electromagnetic radiation is gamma rays. One or more of these forms of radiation can be provided from nuclear decay. For example, gamma rays or gamma radiation can be provided from the formation of radioisotopes through decay. Upon exposure to the radiation and the catalyst, the $N_2$ and $H_2$ can form $NH_3$ as well as unreacted $H_2$ and $N_2$. This product mixture can proceed to chiller 24, whereby liquid ammonia 26 can be separated from unreacted $N_2$ and $H_2$ 30, and $N_2$ and $H_2$ 30 can be recycled and provided to reactor 18.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A method for producing ammonia, the method comprising:
   providing a catalyst comprising material having a band gap >3 eV;
   exposing the catalyst to both $N_2$ and $H_2$; and
   while the catalyst is exposed to both $N_2$ and $H_2$, exposing the catalyst to gamma radiation to form $NH_3$.

2. The method of claim 1 wherein the catalyst is exposed to both $N_2$ and $H_2$ as a mixture.

3. The method of claim 1 wherein the material is a high-band gap material.

4. The method of claim 3 wherein the high-band gap material comprises semiconductive material.

5. The method of claim 4 wherein the high-band gap material comprises $Al_2O_3$ and/or $SiO_2$.

6. The method of claim 1 wherein the catalyst includes a ligand.

7. The method of claim 6 where the catalyst comprises one or more of FeS, FeMo, FeCo, Co, Mo, Ru, FeRu, FePd, FePt, Pd, Pt, FePtPd, FePtO, and/or FePdO.

8. The method of claim 1 wherein the material having a band gap >3 Ev comprises one or more of AlN, $TiO_2$, $SnO_2$, ZnO, $WO_3$, $BaSnO_3$, $Zn_2SnO_4$, $SrTiO_3$, $BaTiO_3$, $ZnTi_3O_8$, BN, BO, SiO, ITO, $ZrO_2$, and/or $ZrSiO_4$.

9. A method for producing ammonia, the method comprising:
   providing a catalyst comprising material having a high-band gap;
   exposing the catalyst to both $N_2$ and $H_2$; and
   while the catalyst is exposed to both $N_2$ and $H_2$, exposing the catalyst to gamma rays to form $NH_3$.

10. The method of claim 9 wherein the catalyst is exposed to both $N_2$ and $H_2$ as a mixture.

11. The method of claim 9 wherein the high-band gap material comprises semiconductive material.

12. The method of claim 9 wherein the high-band gap material comprises $Al_2O_3$ and/or $SiO_2$.

13. The method of claim 9 wherein the catalyst includes a ligand.

14. The method of claim 13, wherein the catalyst comprises one or more of FeS, FeMo, FeCo, Co, Mo, Ru, FeRu, FePd, FePt, Pd, Pt, FePtPd, FePtO, and/or FePdO.

15. The method of claim 9 wherein the material having a high band gap comprises one or more of AlN, $TiO_2$, $SnO_2$, ZnO, $WO_3$, $BaSnO_3$, $Zn_2SnO_4$, $SrTiO_3$, $BaTiO_3$, $Zn_2Ti_3O_8$, BN, BO, SiO, ITO, $ZrO_2$, and/or $ZrSiO_4$.

* * * * *